United States Patent
De Rozarieux et al.

(10) Patent No.: US 12,159,266 B2
(45) Date of Patent: Dec. 3, 2024

(54) SYSTEM, METHOD AND APPARATUS FOR CONTROLLING THE OPERATION OF DETECTION AND MONITORING APPARATUS FOR THE CONDITION OF GUTTERING AND/OR ROOFS

(71) Applicant: HD Sharman Ltd, High Peak (GB)

(72) Inventors: Mark De Rozarieux, High Peak (GB); Jakob Moeller-Jensen, High Peak (GB)

(73) Assignee: HD SHARMAN LTD, High Peak (GB)

( * ) Notice: Subject to any disclaimer, the term of this patent is extended or adjusted under 35 U.S.C. 154(b) by 154 days.

(21) Appl. No.: 17/539,765

(22) Filed: Dec. 1, 2021

(65) Prior Publication Data
US 2022/0172177 A1   Jun. 2, 2022

(30) Foreign Application Priority Data
Dec. 1, 2020   (GB) ..................... 2018927

(51) Int. Cl.
| | | |
|---|---|---|
| *G06Q 10/20* | (2023.01) | |
| *E04D 13/064* | (2006.01) | |
| *G01K 11/24* | (2006.01) | |
| *F16M 11/10* | (2006.01) | |
| *F16M 11/20* | (2006.01) | |
| *F16M 11/24* | (2006.01) | |
| *F16M 13/02* | (2006.01) | |

(52) U.S. Cl.
CPC .......... *G06Q 10/20* (2013.01); *E04D 13/064* (2013.01); *G01K 11/24* (2013.01); *F16M 11/10* (2013.01); *F16M 11/2021* (2013.01); *F16M 11/24* (2013.01); *F16M 13/02* (2013.01)

(58) Field of Classification Search
None
See application file for complete search history.

(56) References Cited

U.S. PATENT DOCUMENTS

| | | | | |
|---|---|---|---|---|
| 4,221,004 A | * | 9/1980 | Combs ............... | G01F 23/2962 367/908 |
| 2005/0045738 A1 | | 3/2005 | Baxter | |
| 2020/0383287 A1 | * | 12/2020 | Klein .................... | A01G 31/06 |

FOREIGN PATENT DOCUMENTS

| | | | | |
|---|---|---|---|---|
| AU | 2019317218 A1 | * | 3/2021 | ............. E04D 13/00 |
| DE | 102004049170 A1 | | 4/2006 | |
| GB | 2575377 B | | 8/2020 | |

(Continued)

OTHER PUBLICATIONS

Ultrasonic Sensor FAQ (2018) (Year: 2018).*
Ultrasonic Sensors for Water Level Measurement (Year: 2016).*
Ultrasonic Sensors Knowledge (Part 4), (Year: 2015).*

*Primary Examiner* — Dennis W Ruhl
(74) *Attorney, Agent, or Firm* — GableGotwals

(57) ABSTRACT

The invention to which this application relates is apparatus and a method for the monitoring of a guttering and/or roofing system. The invention provides monitoring apparatus at at least one portion of a guttering or roofing system to detect the height of material in the gutter at instants of time and determines the liquid component of said material therein. The data received can be used to determine a future maintenance schedule for said guttering system so as to prevent or minimise the risk of the guttering system flooding and/or alert when an immediate reaction is required in order to prevent flooding or leakage of liquid therefrom.

10 Claims, 7 Drawing Sheets

(56) References Cited

FOREIGN PATENT DOCUMENTS

Figure 1:
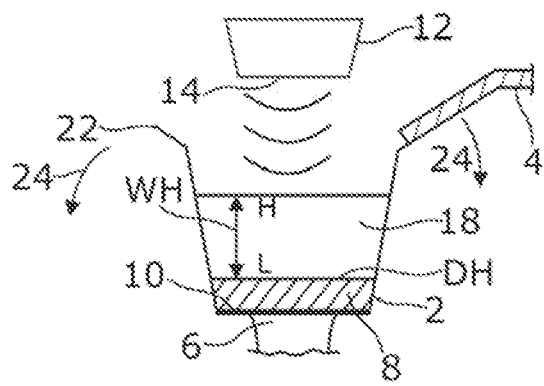

| WO | WO-2018178708 A1 | * | 10/2018 | ........... E04D 13/076 |
| WO | 2020028941 A1 | | 2/2020 | |

* cited by examiner

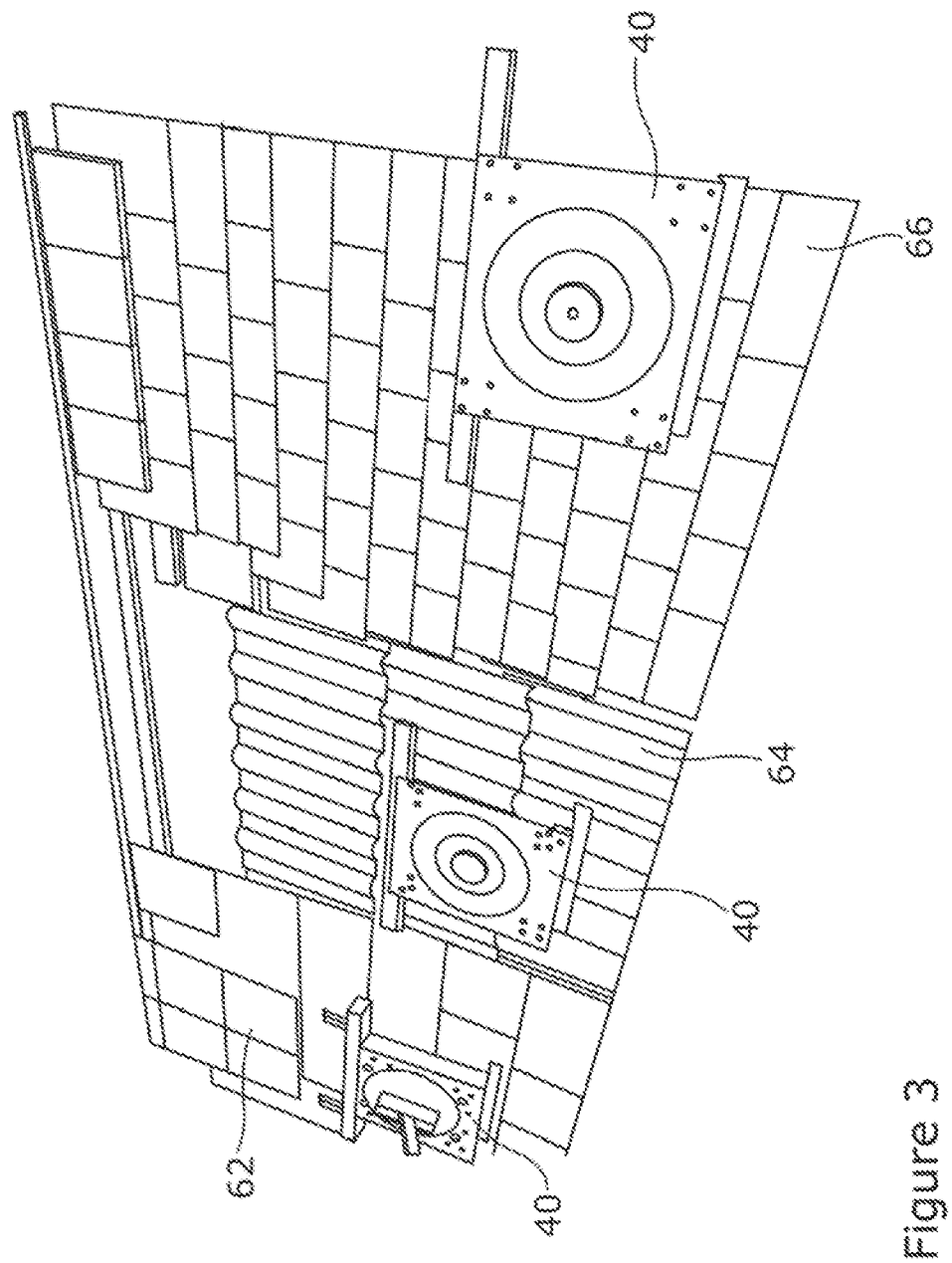

SYSTEM, METHOD AND APPARATUS FOR CONTROLLING THE OPERATION OF DETECTION AND MONITORING APPARATUS FOR THE CONDITION OF GUTTERING AND/OR ROOFS

This application claims priority to British Patent Application No. GB2018927.0 filed 1 Dec. 2020, which is incorporated herein by reference.

The invention relates to the aim of improving the reliability of the control of the flow of water from roof surfaces into and along a guttering system comprising lengths of guttering to thereby avoid water collecting on the said roof surfaces and/or in the guttering and potentially passing into the fabric of the building. Once the water reaches the lengths of guttering, the lengths are arranged so as to encourage the flow of the water towards one or more downpipes whereby the water can flow downwardly to a drainage system and be removed from the location.

While the guttering systems are known to be of relatively long life and to operate without significant requirement for intervention, it is also known that there is a need to maintain the same in order to allow the same to operate as efficiently as possible and to avoid overfill of the guttering lengths which can cause subsequent flooding of the environment surrounding the building or, more problematically, if, for example, the guttering length is a channel gutter, which is located across a surface of the building such as the roof, the flooding of the interior of the building and potential damage to the building and/or apparatus located in the building.

While it is possible for a "one-off" event, to cause damage to the guttering and flooding, it is more commonly the case that the failure of the guttering system is as a result of a lack of maintenance and in particular, schedule maintenance so that, for example, the build-up of debris in the lengths of guttering, mean that the effective part of the guttering lengths, is reduced and hence overfill and hence flooding is more likely to occur.

Despite these known problems, it is still conventionally the case that the guttering systems are not maintained at all or, if they are, tend to be retrospectively maintained as a result of a flooding event having already occurred. Where schedule maintenance does occur, it can be a case that the schedule is based on guess work and/or a desire to reduce the amount of maintenance as much as possible so that the maintenance which is performed, is most typically, not performed at the required time and/or with less frequency than is required.

The reasons for this are typically, the expense of the maintenance, the problems in gaining access to the guttering system and/or a general lack of awareness of the need to maintain the guttering systems. The applicant, in their patent, GB2575377, discloses monitoring apparatus which assists in maintaining the efficiency of the guttering system and also reducing the risk of catastrophic flooding events.

An aim of the present invention is therefore to provide a method and apparatus to allow the maintenance and the monitoring of a gutter system to be performed in a manner which optimises the benefits which are maintained from the maintenance and monitoring, ensures that the guttering system operates in an efficient manner and, as a result, the damage to the property is reduced.

In a first aspect of the invention, there is provided a method for the monitoring of a guttering system, said method comprising the steps of providing monitoring apparatus at at least one portion of gutter of the guttering system, wherein said monitoring apparatus detects the height of material in the gutter at instants of time and determines the liquid component of said material therein and determines a future maintenance schedule for said guttering system so as to prevent or minimise the risk of the guttering system flooding.

Typically the future cleaning schedule is determined with respect to known environmental parameters and historical data received from the monitoring apparatus.

Typically said maintenance schedule involves the cleaning of the gutters to remove debris from the same and thereby increase the effective depth of the gutter and hence capacity for the gutter to carry drainage water along the same.

In one embodiment the monitoring includes the detection of debris in a portion of the guttering and/or type of debris and/or depth and/or other parameters at an instant of time and repeating the same over a predetermined time interval, and collating the data to provide a historical database for said portion of guttering.

Typically said historical data is referred to in order to generate a prediction of the condition of the portion of guttering for a future time interval.

In one embodiment, the determination of the cleaning schedule is generated with respect to a risk value which is determined by, in one embodiment, the organisation in control of the maintenance of the guttering system and, as a result of that risk value, an indication can be determined as to the likelihood of failure of the guttering system over the future time interval and, as a result of that prediction, the maintenance schedule is developed which allows maintenance to be performed on the guttering system to a sufficient extent so as to minimise or prevent the risk of said predicted guttering failure occurring.

In one embodiment, the said maintenance schedule will determine the number of times which maintenance is required to be performed in the future time interval and may also include a time schedule for the maintenance to occur so that for example, more maintenance may occur in a subset of weeks or months in the future time interval depending on the historical data from the gutter which indicates, for example, that the gutter is more likely to be filled with drainage water in particular months of the time interval and hence when there may be a greater risk of the gutters overflowing.

Thus, in accordance with the invention, there is provided a means of developing a maintenance schedule for a future time interval of the guttering system based on the historical data which is obtained from the monitoring of at least one portion of the guttering system.

In one embodiment, the historical data continues to be collected and input so as to alter the prediction for the future time interval as appropriate.

In one embodiment, the system allows for an alert to be generated for a subset of a future time interval which may be, for example, a number of days ahead of an instant of time at which the alert is generated and, in order to generate the said alert, data relating to a predicted forecast for weather can be referred to so as to, for example, determine a particular event occurring which may cause significant rainfall and potentially overwhelm the guttering system if action is not taken. Thus, in addition to providing a longer-term maintenance schedule, a short-term and immediate maintenance alert can be generated.

In one embodiment the detection apparatus is installed in position on the roof structure using apparatus to determine that the angle of orientation of the detection head including said at least one camera and sensor means with respect to the said portion of gutter is aligned and then the apparatus is locked in position.

In one embodiment the method includes selecting a base which is the interface between the roof structure on which the apparatus is mounted and the remainder of the detection apparatus, Typically a range of different configuration bases are available for use and a base is selected with respect to the form of roof structure with which the apparatus is to be used, and/or whether the location of the apparatus on the roof structure is to be temporary or permanent.

In one embodiment the apparatus includes a support arm mounted at one end to the base and at the opposing end to a detection housing and the method of installation of the apparatus includes adjusting the length of the support arm, adjusting the angle of the support arm with respect to the base and/or adjusting the angular position of the detection head with respect to the support arm.

In one embodiment the intervals between detection data being generated is adjusted as a result of a particular event such as a weather event, and/or by the operator of the apparatus determining the intervals between the detection. In one embodiment the determination may be made in order to generate more frequent detected data upon first use of the apparatus and/or as a result of a particular detected condition of the said portion of gutter.

In one embodiment the detected data is processed so as to determine the height of material in the gutter portion with respect to the freeboard height from the gutter portion base rather than the height of the top of the gutter wall from the base.

Typically the freeboard height is approximately 0.7× the height of the top of the gutter wall from the base.

In one embodiment the data is processed with reference to the type of drainage system used. In one embodiment the drainage system is a syphonic drainage system.

In one embodiment the detected data which is collected includes data representative of the ambient environmental temperature at the time of data collection and the said temperature data is referred to in order to take into account variation in the speed of sound caused by temperature fluctuation when processing the data received by the ultrasonic sensor.

In a further aspect of the invention there is provided apparatus for use in determining the condition of a portion of a guttering system for a roof structure, wherein said apparatus includes a base for location with the roof structure, a support arm which is attached to the base at one end and at the opposing end there is mounted a detection head with which is located at least one camera to collect image data from said gutter portion to which the same is directed and at least one ultrasonic sensor means for emitting towards and receiving data signals from the said portion of gutter, transmission means for sending the detected data to a remote location for processing to determine a future maintenance schedule for the guttering system and said detection head position with respect to said gutter system is angularly and linearly adjustable at the time of installation.

In one embodiment the apparatus includes a temperature detection means to detect the ambient environmental temperature at the time of collection of data from said at least one camera and ultrasonic sensing means.

In one embodiment the apparatus includes a range of bases of different configurations and the selection of a particular base for use at an installation of the apparatus is made with respect to the configuration of the roof structure and/or whether the apparatus is to be permanently or temporarily located on the roof structure.

It should be appreciated that reference hereon in to the maintenance of the guttering system, may include action such as the clearance of debris from the gutter channel or particular portion of the gutters of the guttering system, the removal of debris from the surfaces on which the rain falls so as to prevent the same from being washed into the guttering system by the rainfall as it flows towards the guttering system channels and/or the maintenance of surrounding vegetation such as trees, shrubs and the like which may drop debris onto the guttering system or the surfaces adjacent to the same and, typically a combination of these actions will be performed.

Figure 4A:
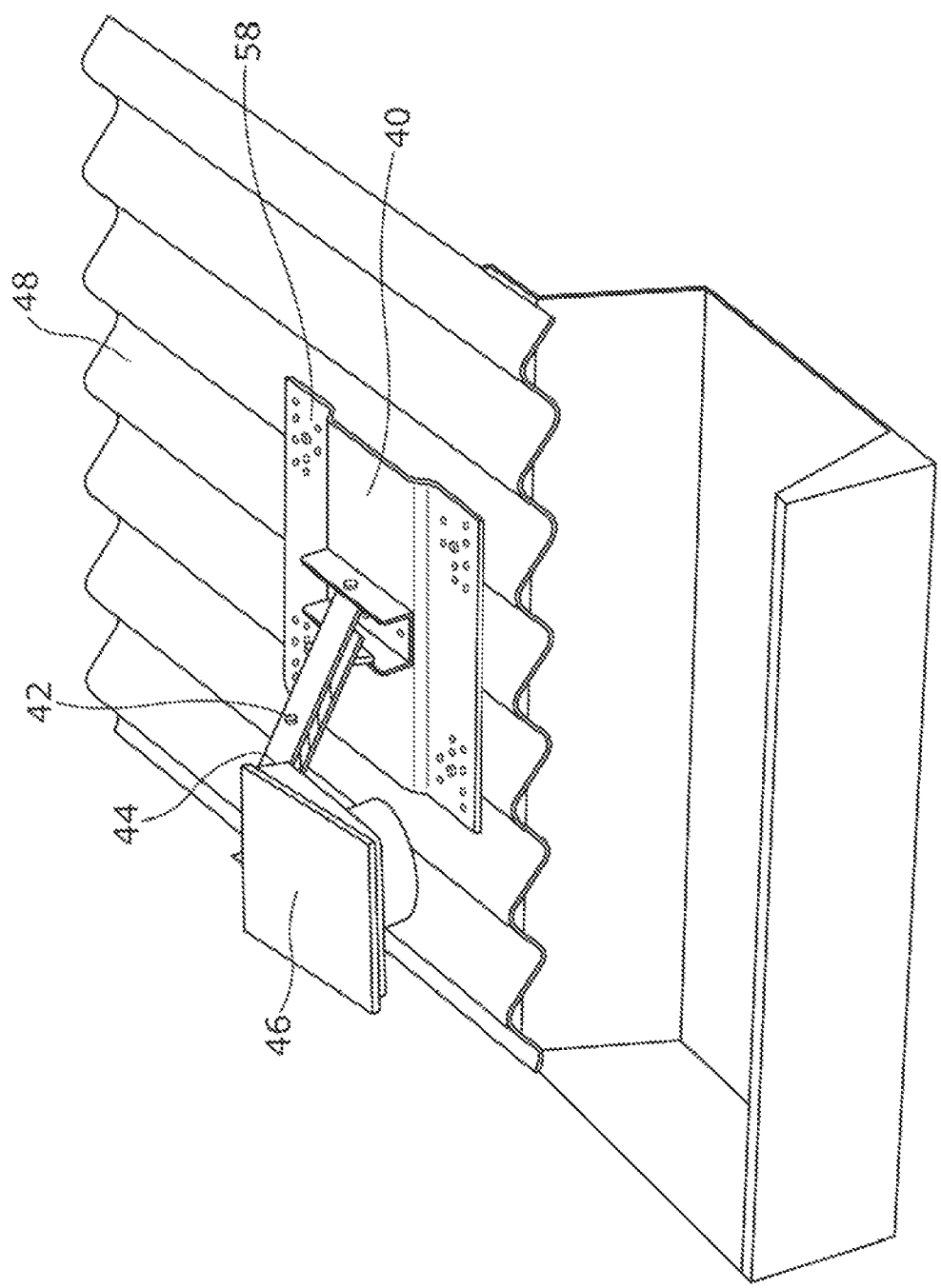
Figure 4B:
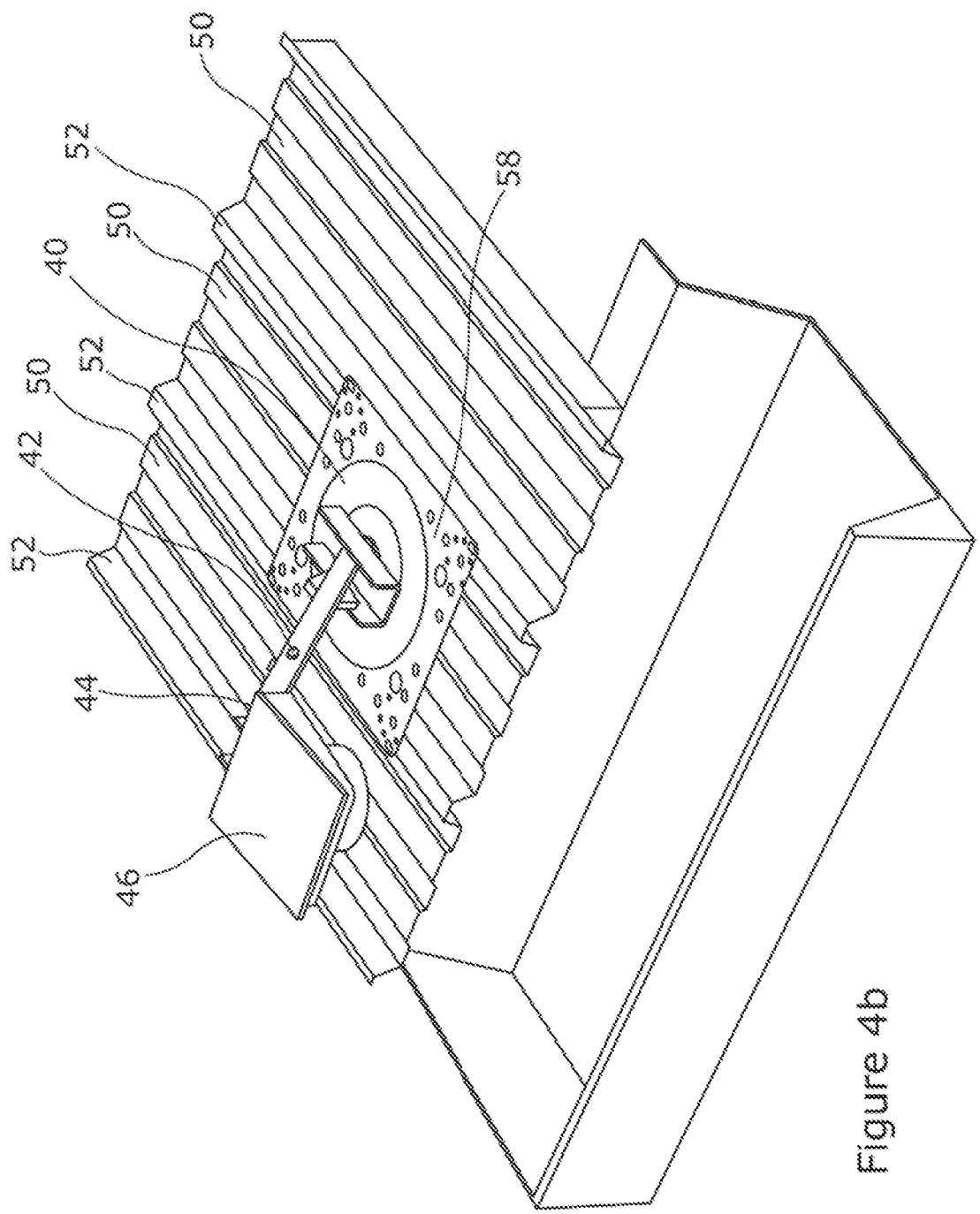
Figure 4C:
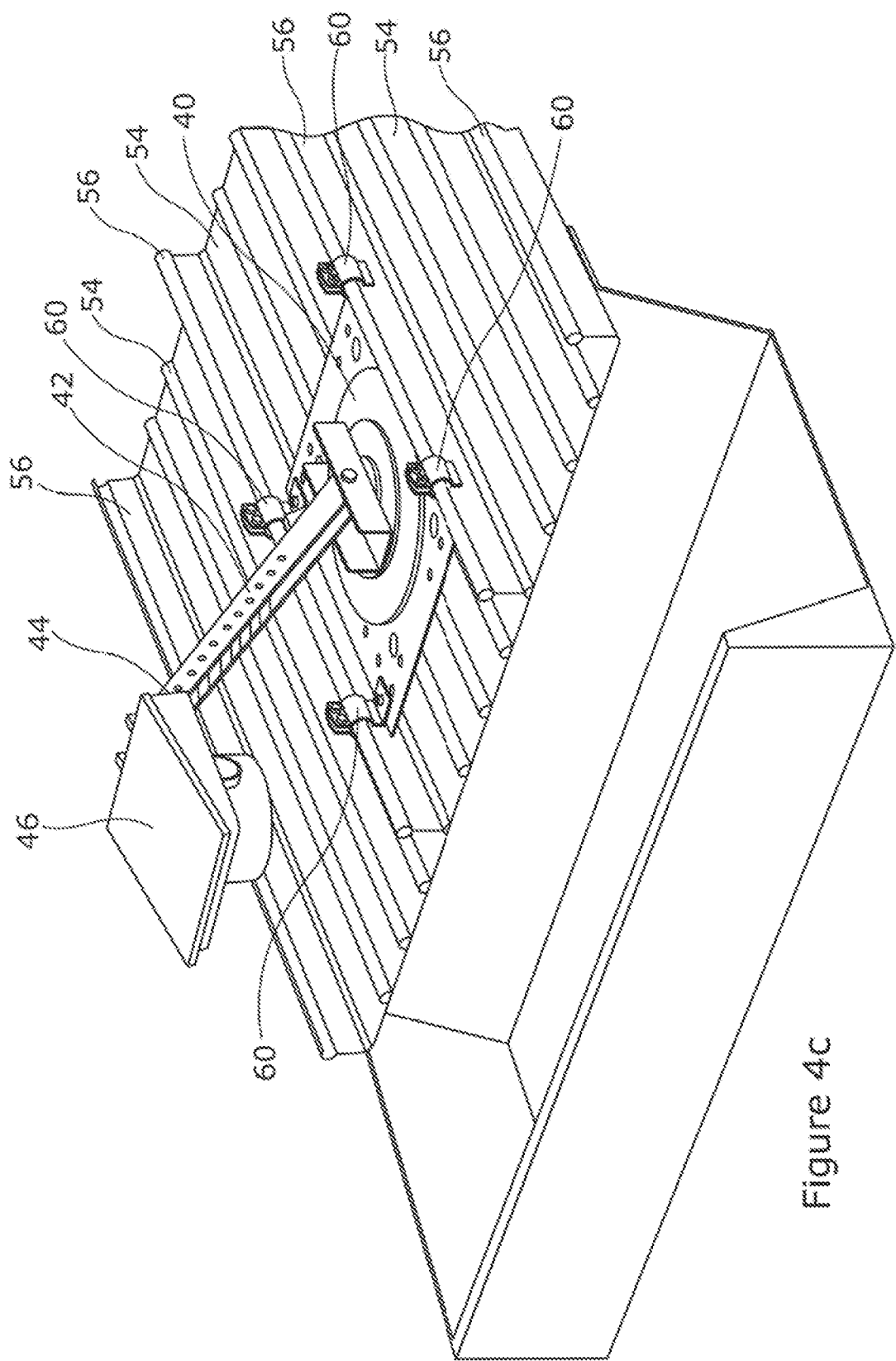
Figure 5:
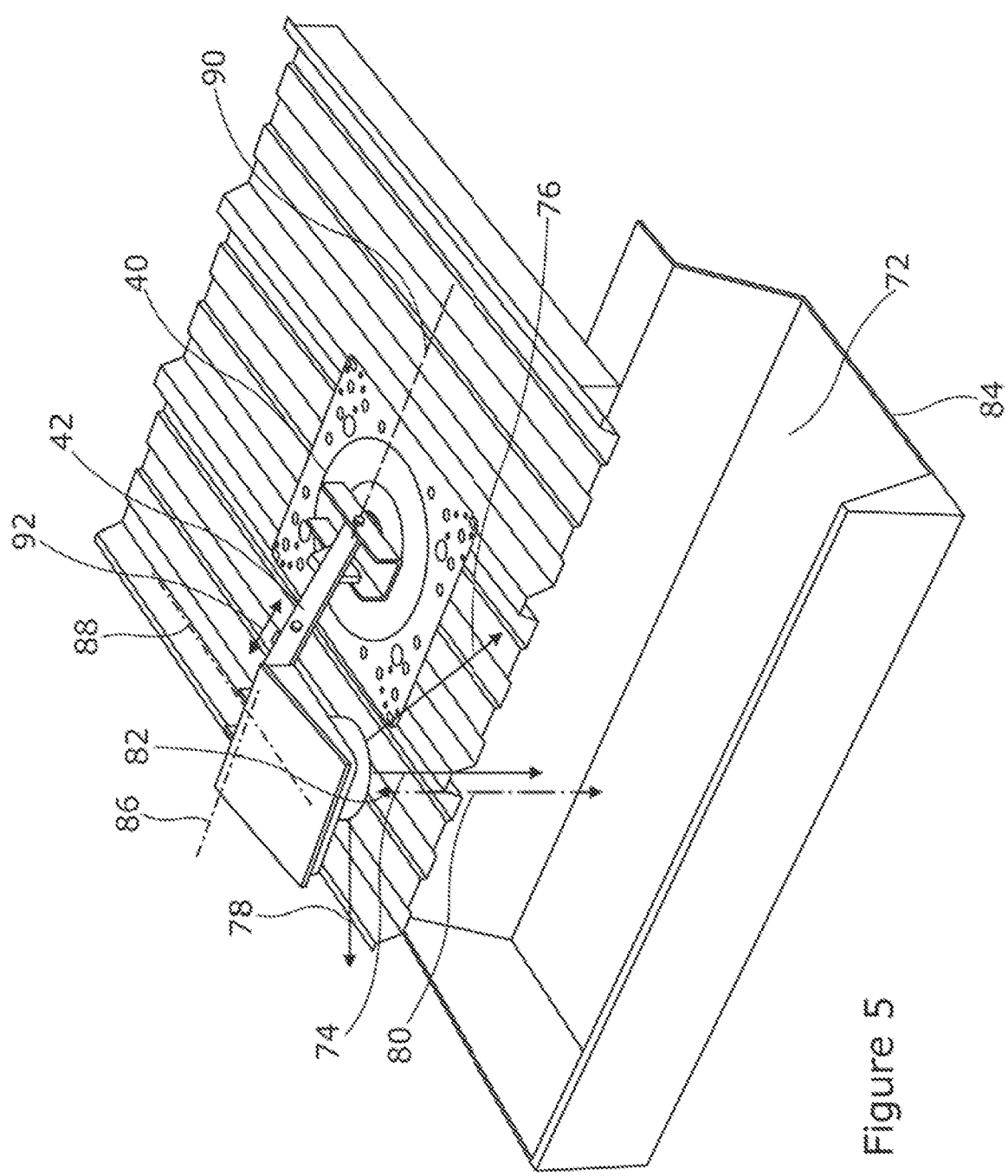

Typically, the apparatus which is used to perform the monitoring and to generate the historical data, is that which is described in the applicant's patent Specific embodiments of the invention are now described with respect to the accompanying drawings; wherein FIG. 1 illustrates a portion of a gutter with monitoring apparatus in accordance with one embodiment of the invention;

FIGS. 2*a-e* illustrate a method of generating a future maintenance schedule in accordance with one embodiment of the invention;

FIG. 3 illustrates different forms of base and roof structure with the apparatus in accordance with one embodiment of the invention may be used;

FIGS. 4*a-c* illustrate further configurations of roof structure with which the apparatus can be used; and FIG. 5 illustrates the apparatus of the invention in accordance with one embodiment of the invention.

Figure 6:
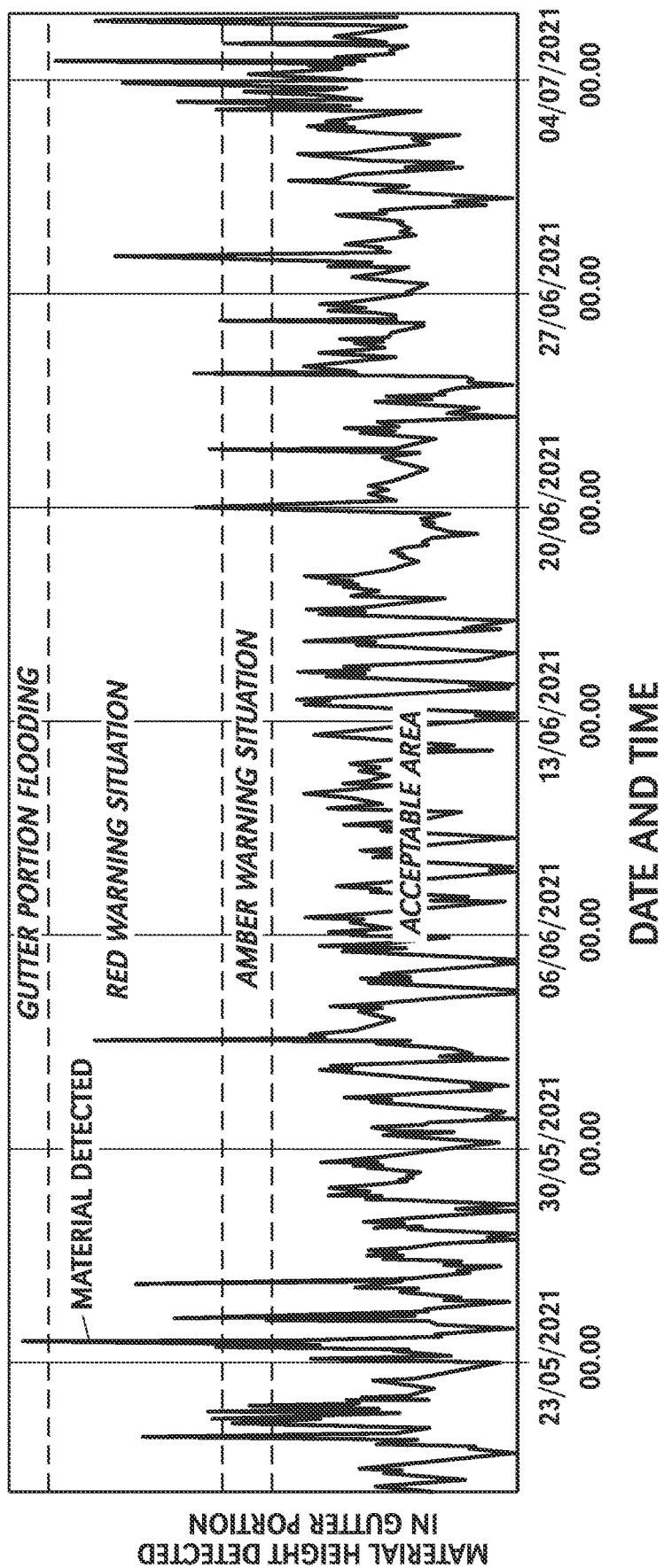

FIG. 6 is a graph showing test data over a period of time.

Referring firstly to FIG. 1 there is illustrated schematically an end elevation of a length of gutter 2 of a guttering system. The guttering system is typically provided with lengths of interconnected gutters and the gutters may be located along the edge of a roof 4 structure and/or may be provided as valley gutters running along interior sections of the roof of the building so as to collect rainwater which flows off the roof and then the gutters transfer the water to one or more downpipes 6 through which the water flows to be dispersed from the building via a drainage system. Unfortunately in practice the gutters also collect other material in the form of debris carried from the roof 4 and into the gutter by the flow of rainwater, such as leaves, twigs and/or discarded packaging which may be carried by wind and these all collect as debris 8 in the base 10 of the gutter.

The monitoring apparatus 12 includes one or more sensing means 14 and/or cameras so as to provide data reading and/or images of the gutter as is described in the applicant's granted patent. The sensing means 14 collects a reading of the surface height H of the total material in the gutter at that time. The processing means which receives the data from the sensing means then uses previous data to resolve the data from the sensing means into a pair of High (H) and low (L) readings with the L reading indicating the height (DH) of the debris 8 in the gutter and the difference between the H and L readings provides a value for the height of the water (WH) in the gutter 2.

Figure 2A:
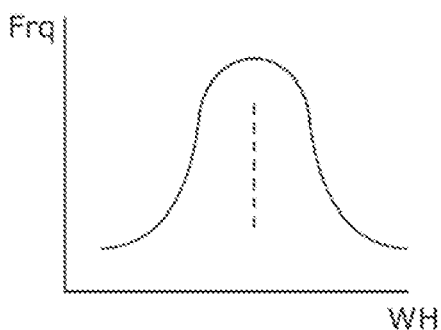
Figure 2B:
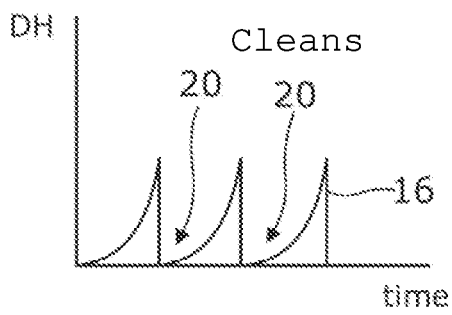

The WH observations are then plotted on a distribution chart against Frequency as shown in FIG. 2*a* and the DH readings are plotted against time as shown in FIG. 2*b*. As illustrated when a gutter maintenance schedule is implemented at predetermined intervals so that cleans 20 are performed at the time intervals shown, then a saw tooth plot 16 is provided.

The effect of the quantity of water 18 in the gutter is therefore less of an issue when there is no, or a relatively small, DH reading. However when the DH reading increases so the space between the DH reading and the top edge 22 of the gutter decreases which, in turn increases the risk of water overflowing the top edge and therefore pouring over the top edge and out of the gutter as indicated by arrows 24 in FIG. 1 and cause potential flooding.

Figure 2C:
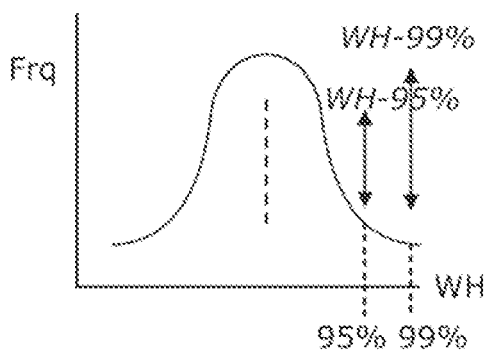

As shown in FIG. 2c the confidence level of the maximum water heights (WH) are derived using normal/Poisson distribution calculations based on Standard Deviation multiples. The organisation or maintenance company in charge of the particular building for which the monitoring is performed will then indicate the confidence level that they would like the maintenance schedule to be based on.

Figure 2D:
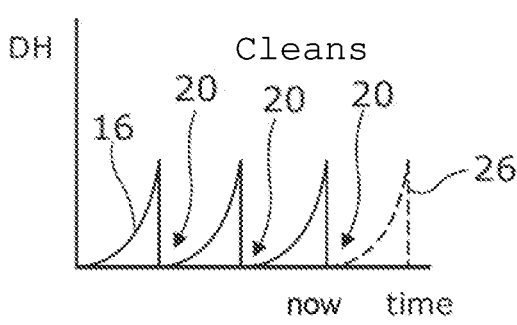

As shown in FIG. 2d the growth in the amount of debris and hence increase in the DH value between cleans 20 is known and the build up in debris value DH is projected forwards 26, in time based on the historical data which is known from the gutter portion 2.

Figure 2E:
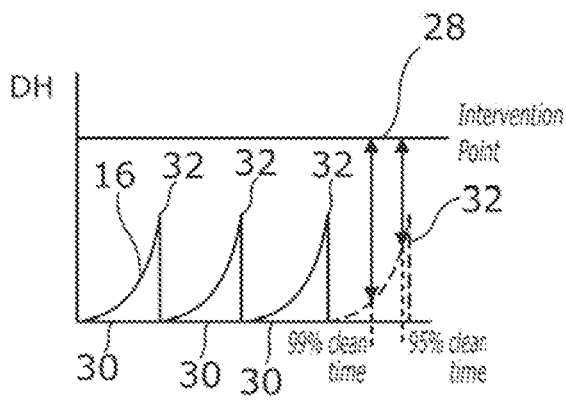

As shown in FIG. 2e an intervention level or point 28 is selected with respect to the height of the freeboard of the gutter, or top edge 22 of the gutter or another selected criteria. Different confidence levels, such as 99% or 95% can be set and hence the interval times 30 between cleaning 20 intervals can be scheduled so as to ensure that the peak 32 DH value between cleans 20 will not, or only in extreme events, reach the intervention level 28.

As such it will be appreciated that the apparatus and method in accordance with the invention minimise the risk of flooding and potential damage to the fabric of the building and/or contamination of surrounding environments by ensuring that the future cleaning maintenance schedule which is set avoids the overflow of the guttering system.

It is found that during the operation of the apparatus and system in accordance with the invention, that variation in the data readings from the ultrasonic sensor, can be caused by the variation of temperature, rather than changes in the height of the material in the gutter portion. It is found that data obtained within one temperature range may differ from the readings taken from the same gutter portion during a different temperature range, even though the actual condition and material levels in the gutter are the same at all times. This can therefore lead to incorrect readings and/or confusion as to the actual status of the gutter portion at that time and the applicant has discovered that this due to variation in the speed of sound, and hence ultrasonic signal return, caused by the change of temperature between different detection times. In order to overcome this problem, the apparatus in accordance with the invention includes a thermistor or other temperature sensing means in order to allow the temperature, at the time of the data being recorded, to be known and, to be taken into account when assessing the data results and so the accuracy of the detected date transmitted for further processing are significantly improved.

A further issue in improving the accuracy of the data collected by the apparatus is to ensure that the data for the gutter condition is unaffected by any peripheral apparatus such as for example the roof structure itself. In order to reduce this possibility, the apparatus can be installed using laser or other measuring techniques, so as to ensure that the detection head of the apparatus is located sufficiently accurately so as to detect the readings from the gutter portion alone. Once the apparatus has been installed, then the same can be locked in position and the laser or other detection measuring apparatus removed.

In one embodiment and as shown in FIGS. 4a-c, the apparatus comprises a base 40 to which a support arm 42 is mounted and, at the opposing end 44 of the support arm from the base, the detection apparatus head 46 is located.

The base 40 can be provided in a form to suit the particular form of roof structure on which the same is to be located with, in FIG. 4a, the roof being of a corrugated sheet 48 form to which the base is secured. In FIG. 4b, the roof structure is shown to be of a series of panels 50 which are joined together at raised portions 52 and in FIG. 4c a series of relatively flat panels 54 are provided and joined by raised portions 56. The base 40 can be provided with a number of available apertures 58 for the selective receipt of securing means therethrough as indicated so as to allow the selective placement therein of the securing means so as to suit the particular shape of the roof panels at that location as shown in FIGS. 4a and b. In FIG. 4c the base is secured to the raised portions 56 by clamps 60. With regard to FIG. 3, there is illustrated the location of bases 40 on different forms of roof structure with the base being shown in different formations so as to allow the same to be attached to a roof structure formed of relatively large overlapping flat slates 62, a roof structure of ridge tiles 64 and a roof structure formed of relatively smaller slate tiles 66 and therefore it will be appreciated that the apparatus is range taking in the terms of the type of roof structure to which the same can be used and attached. The aim in each case is to avoid, where possible, penetration through the roof structure.

Furthermore, in another embodiment the base may be provided with a sufficient weight so as to allow the same to be positioned on the roof structure and then be subsequently moved, without the same having to be attached to the roof structure. This is particularly attractive in terms of providing the apparatus temporarily on the roof structure so as to monitor the performance of a particular portion of the gutter system.

In each embodiment and with reference to FIG. 5 the apparatus includes a support arm 42 which extends from the base at one end and, at the opposing end, there is mounted the detection head 46 thereon. Within the detection head there is located typically three cameras, a first camera directed to collect images from the underlying gutter 72 in the direction of arrow 74, a second camera directed to collect images in the direction 76 along the gutter and a third camera arranged to collect images in the direction of 78 along the gutter. Typically, the second and third cameras are arranged at an angle of 2-10 degrees to horizontal so as to ensure that the data which is collated relates to the gutter portion. Also provided in the detection head is at least one ultrasonic transducer which is capable of emitting downwardly, a signal in the direction 80 and then operating to receive the reflected signal 82 from the gutter. The distance between the base 84 of the gutter and the detection head is known and therefore any detected data from the ultrasonic transducer subsequently collected, can determine whether the time taken for the sending and receipt of the ultrasonic signal, indicates whether the signal has hit the base of the gutter or has hit material which is lying in the gutter and which may be liquid or debris or a combination of the same and thereby allows the height of the material with respect to the base to be calculated and then processed for the generation of a future maintenance schedule which is suitable to maintain the safe operation of the gutter system.

In order to ensure that the detection head operates accurately, it is important that the detection head is angularly positioned with respect to the gutter portion base so as to overlie the same and thereby avoid any possibility of interfering detection data from the adjacent roof structure. The detection head is typically angularly adjustable about axes 86,88 with respect to the support arm 42 and the support arm is angularly adjustable with respect to the base 40 along axis 90. Furthermore, the length of the support arm is adjustable as indicated by arrow 92 so as to thereby ensure that the detection head is appropriately located above the gutter. If required, the detection head may be used in conjunction with or be replaced by, at the time of installation, a measurement device such as a laser device which allows the laser setting of the position of the detection head and the laser device can then be removed and the detection means activated.

Typically, the transducer and cameras will be mounted in the detection head using suitable components which ensure the accuracy and maintenance of position of the cameras and transducer during the subsequent use of the apparatus which is important when one considers the apparatus may have been installed and then left in position on a roof structure for a prolonged period of time. Typically, the detection head has its own power supply which allows tens of thousands of detections to be undertaken without intervention in the power supply being required. Furthermore, the detection head typically includes or is provided in conjunction with, illumination means which allow the said gutter portion to be illuminated when detected ambient light is deemed to be below a certain level and so as to allow the cameras to still obtain image data during the hours of darkness and so ensure that accurate camera images are obtained.

The provision of the ultrasonic sensing means to detect the height of the material in the gutter portion at an instant of time, in conjunction with the images which are obtained from the cameras, mean that a determination can be made as to the height of the material in the gutter portion at that time and also the components of the material so that for example, if the height is detected as being medium, then reference to the camera images can determine whether that is due to water passing along the gutter after for example, a rain shower or whether the height is due to debris other than water which has collected in the gutter portion and which, if not removed as part of the subsequent maintenance schedule, will mean that when there is a rain shower, the addition of liquid to the gutter portion will mean that the height will increase further and therefore may represent a flooding risk over time.

Typically, the frequency at which data readings are taken, can be adjusted as a result of a particular event such as a weather event, can be determined by the operator of the apparatus to suit a particular requirement so that for example, they may wish to obtain a larger group of data upon first use of the apparatus in which case the readings would be taken relatively frequently and thereafter the frequency of the readings is reduced. In a further embodiment, the frequency of the data readings may be altered as a result of a particular detective condition of the gutter so that for example, if a higher proportion of water or debris is detected as being located in the gutter at a particular time, the frequency of data readings will be increased.

Typically, the analysis of the data readings is performed with regard to the "free board" condition rather than a completely full condition of the gutter so that, the free board condition which is typically ⅝th of the height of the gutter, is taken to be the position at which an alert or other activation means occurs so as to indicate that the gutter is possibly overflowing.

In one embodiment, the apparatus and data readings take into account the particular type of drainage which is occurring from the gutter so that, for example, if the drainage is siphonic then data readings can be used to detect whether the siphonic drainage effect is occurring.

The apparatus may be provided with deterrent means to deter external events from effecting the operation of the same such as, for example, the provision of bird spikes on the apparatus to prevent birds from settling or nesting on the assembly.

Test data resulting from the use of the apparatus as herein described, is indicated graphically over a period of time in FIG. 6 in which, the X axis is a time base with the dates at which the apparatus is operated to collect data indicated and the Y axis is the height of the material which is detected in the gutter portion by the apparatus in accordance with the invention.

It will be seen that the graph is split into different visual bands, with the top band indicating a zone which, if a data reading enters into the same, indicates that the gutter portion is flooding, a lower band which indicates that if readings are detected of a material height within that section that a red warning situation is present, a next lower section which, if readings are detected in that section can be classed as an amber warning and the lowest section from the x axis which is the green or acceptable area in which it is desired that the majority of detected data of the material height in the gutter portion will lie.

It is shown when the detected data has been obtained and the data is transmitted to a remote location typically via a mobile phone network to a remote location so as to allow historical data and the future maintenance schedule to be developed with respect to the historical data for the gutter portion and new data as and when detected.

It will be appreciated that similar data may be collected from other guttering portions as part of the guttering system or alternatively, only one gutter portion which is regarded as being critical to the gutter system may be monitored. The data therefore allows an immediate response to be taken, if it is found that data readings as to the height of the material in the gutter, are at the flood level as would be indicated for example, with regard to one occasion in table 1 and also, the detected data can be used as historical data so as to generate a record over a prolonged period of time of the operation of the guttering system and how the change in the depth of material occurs over a prolonged period. As a result of this, steps can then be taken to prepare a planned scheduled maintenance so as to, for example, prevent the detected height of material in the gutter from ever being close to the top or red warning sections of table 1. This therefore allows a scheduled maintenance to be performed so as to minimise the risk of failure or flooding whilst, at the same time, also ensuring that the maintenance which is performed is done at the relevant intervals and therefore also prevents and minimises expense which may be incurred in undertaking the maintenance which is not actually required.

The invention claimed is:

1. A method for the monitoring of a guttering system, said method comprising the steps of:
 providing monitoring apparatus at at least one portion of gutter of the guttering system, said monitoring apparatus is a detection head which includes at least one camera and at least one sensor and further includes a support arm mounted at one end to a base and at an opposing end to the detection head, the base is an interface between a roof structure on which the apparatus is mounted and a remainder of the monitoring apparatus, a range of different configuration bases are available for use;

selecting the base with respect to a form of the roof structure with which the monitoring apparatus is to be used, and whether a location thereon is to be temporary or permanent;

detecting, by way of the monitoring apparatus, a height of material in the said at least one portion of gutter at time intervals, said material including a liquid component and a debris component;

sending data representing the detected height of the material to processing means including software, the software:

using data representing the detected height of material to determine a quantity of said debris component of said material so as to determine an effective depth of the portion of said gutter which is available to allow liquid to travel therealong; and assessing known environmental parameters and historical data received from the monitoring apparatus to thereby determine a future maintenance schedule for clearing said debris component from said guttering system so as to increase said effective depth of said guttering to a level so as to minimise the risk of flooding from said guttering system by said liquid flowing therealong and with reference to a predetermined risk of flooding value.

2. A method according to claim 1 wherein the said historical data is referred to in order to generate a prediction of a condition of the portion of gutter for a future time interval.

3. A method according to claim 1 wherein an indication is determined as to a likelihood of failure of the guttering system over a future time interval and the future maintenance schedule determines maintenance actions to be performed on the guttering system so as to minimise risk of said predicted guttering failure occurring.

4. A method according to claim 1 wherein the said future maintenance schedule determines the frequency at which maintenance is required to be performed in a future time interval and/or a time schedule for the maintenance to occur.

5. A method according to claim 1 wherein an alert is generated for a subset of a future time at which flooding may occur.

6. A method according to claim 1 wherein the monitoring apparatus is installed in position on a roof structure using measurement apparatus to determine an angle of orientation of the at least one camera and at least one sensor with respect to the said portion of gutter and then the monitoring apparatus is locked in position.

7. A method according to claim 1 wherein the method includes adjusting a length of the support arm, adjusting an angle of the support arm with respect to the base and/or adjusting an angular position of the detection head with respect to the support arm.

8. A method according to claim 1 wherein the intervals between detection data being generated is adjusted as a result of a particular event such as a weather event, and/or by the operator of the apparatus to generate more frequent detected data upon first use of the apparatus and/or as a result of a particular detected condition of the said portion of gutter.

9. A method according to claim 1 wherein the method processes the detected data with respect to the type of drainage from the system.

10. A method according to claim 1 wherein the detected data includes data indicating the ambient environmental temperature at that time and referring to the detected temperature when processing the data received by the ultrasonic sensor.

* * * * *